United States Patent Office

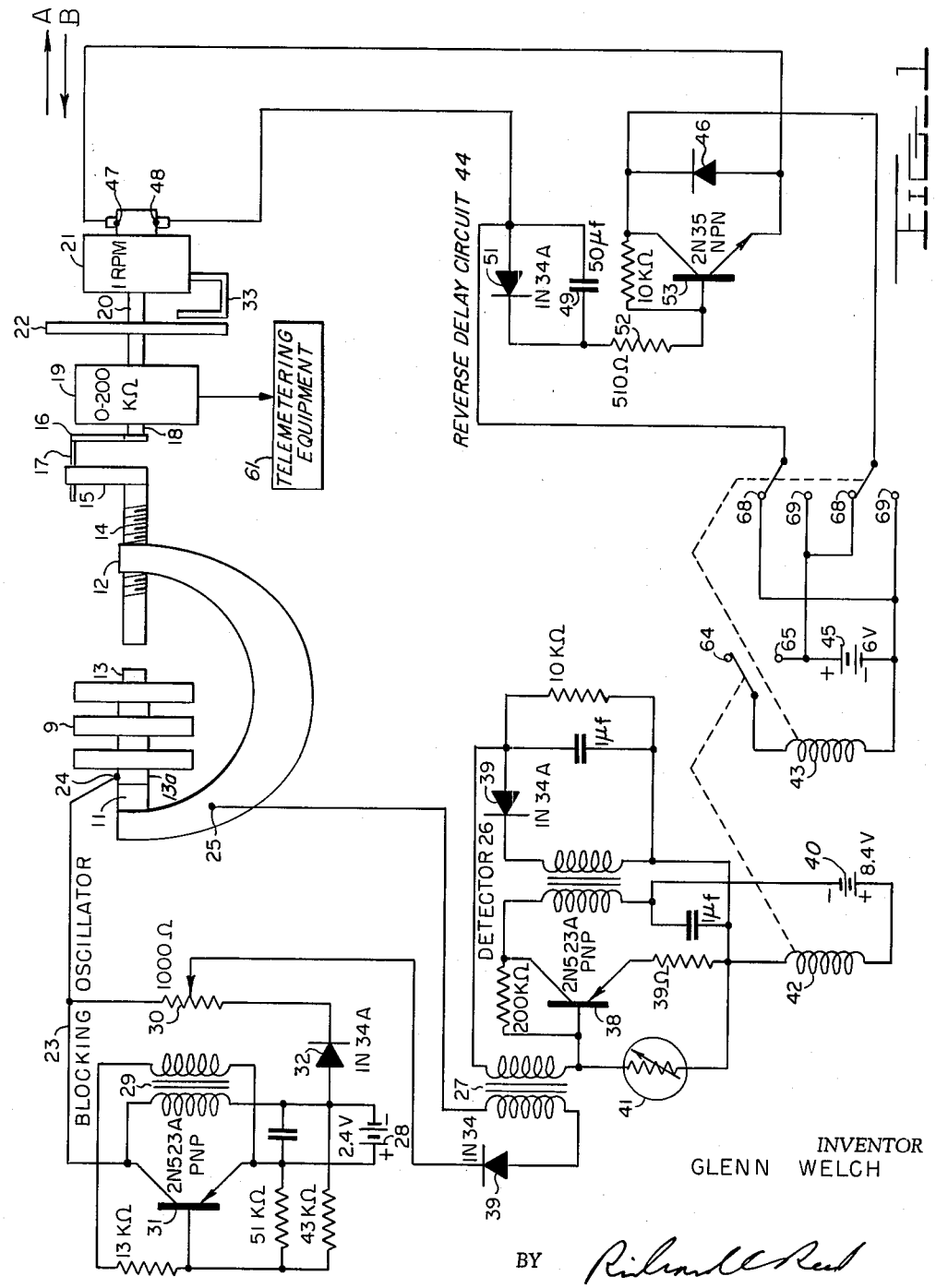

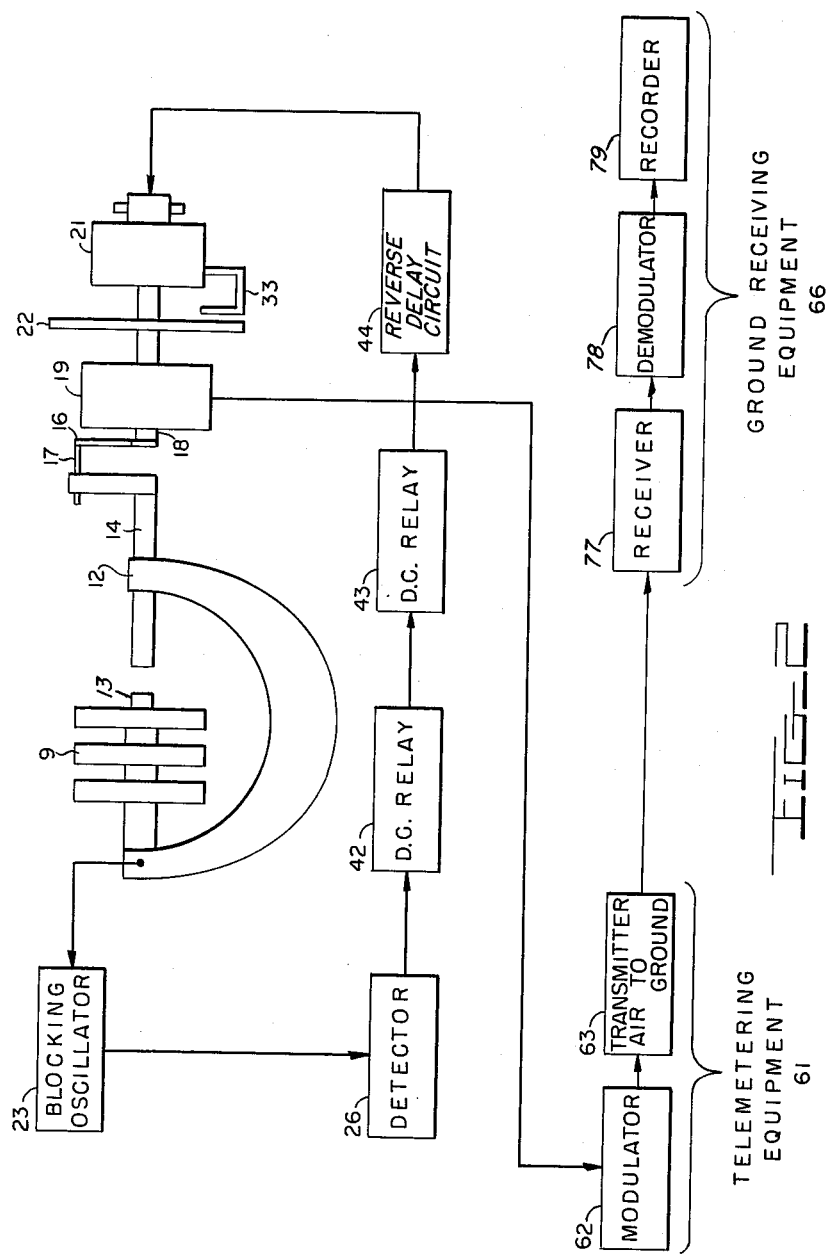

3,225,598
Patented Dec. 28, 1965

3,225,598
AUTOMATIC PRESSURE ALTIMETER
Glenn Welch, 52 Highland Place, Indian Head, Md.
Filed Apr. 29, 1963, Ser. No. 276,666
7 Claims. (Cl. 73—386)
(Granted under Title 35, U.S. Code (1952), sec. 266)

The invention described herein may be manufactured and used by or for the Government of the United States of America for governmental purposes without the payment of any royalties thereon or therefor.

The present invention relates generally to automatic pressure altimeters, and more particularly to an automatic pressure altimeter for modulating radiosonde equipment.

Previously, radiosonde pressure transducers and hypsometers were normally used to provide the necessary pressure measurement during balloon flight. Both of these pressure measuring devices are limited, however, in that the radiosonde pressure transducer will not perform satisfactorily above eighty thousand feet, and the hypsometer, which is capable of performing above eight thousand feet will not provide a reading while it is both ascending and descending.

The present invention is a pressure measuring device which is capable of automatically and sensitively measuring pressure changes above eighty thousand feet while both ascending and descending, thereby correcting the apparent defects of the equipment presently being used. As man reaches further into the atmosphere to study the unknown environment around him, he must necessarily have the proper scientific tools to assist him in these studies. This invention primarily encompasses such a tool.

An object of the present invention is to provide a pressure altimeter that will operate above eighty thousand feet.

Another object is to provide a pressure altimeter that has a high degree of sensitivity above eighty thousand feet.

A further object is to provide a pressure altimeter that will record pressures while both ascending and descending.

A further object is to provide a pressure altimeter which can be used in ground stations wherein the telemetering equipment requires a resistive output.

Still another object is to provide a pressure altimeter having a resistive output that will operate in conjunction with standard radiosonde equipment.

A final object is to provide a pressure altimeter that is inexpensively assembled from standard components.

Other objects and many of the attendant advantages of this invention will be readily appreciated as the same become better understood by reference to the following detailed description when considered in connection with the accompanying drawings in which like reference numerals desigate like parts throughout the figures thereof and wherein:

FIG. 1 is a detailed diagram of the electrical circuit and pressure elements.

FIG. 2 is a block diagram of FIG. 1, showing the relation of the instant invention to telemetering equipment and ground receiving equipment.

Referring now to the drawings, wherein like characters designate like or corresponding parts throughout the several views, there is shown in FIG. 1 an aneroid cell system 9 having one end mounted by means of an ordinary set screw to an insulator block 11 with the insulator block in turn being mounted to one end of an attaching member 12. Each end of aneroid cell 9 has a contact 13 mounted thereon with the contact adjacent the insulator block 11 being used as a connecting point. Member 12 can be of any shape, but more particularly, should be generally U-shaped, and can be adapted for use from a standard outside micrometer or the like. Mounted on member 12 opposite aneroid cell system 9 and insulator block 11 is a precision contact screw 14, which can be the screw of a standard micrometer or the like.

Contact screw 14 has a linking member in the form of a clip 15 mounted at one end by a set screw, wherein the clip is made of resilient metal or of temperature compensating bi-metallic elements with clip 15 mechanically connected to a rheostat shaft 18 by means of an arm 16 having an integral shaft 17.

Rheostat 19, which provides the necessary resistive value of pressure to ground, is a specially constructed wire wound potentiometer having an electrical angle of 358° and a mechanical angle of 360°, and may be of any value, depending on the telemetering instrument used. Rheostat 19 is connected by a shaft 20 to a reversible drive motor 21 which controls the movement of shaft 20, rheostat shaft 18, and contact screw 14, the operation of which will be more fully explained later.

A dial having a pointer 33, and which can be graduated in any manner, such as in degrees, minutes, angles, etc., is mounted between the motor 21 and potentiometer 19 and is primarily used as a calibration dial for initial calibration of the entire device before an actual flight. The dial is fixed to the shaft 20, while pointer 33 is stationary mounted. The dial 22 can also be used as a ready pressure reference on the ground after the resistive value of the rheostat has been converted to a pressure value, and when used in this capacity, the calibration points are read from the dial only when the dial is at the rest position of the motor cycle, which will become clear when a complete cycle of operation is later explained.

A conventional blocking oscillator 23 which supplies a signal when contact is made between members 13 and 14, is electrically connected to members 12 and 13a at points 24 and 25, with the blocking oscillator 23 in turn being connected to a detector 26 by means of an impedance matching transformer 27. Blocking oscillator 23 has a battery 28 supplying the necessary operating power and comprises essentially a feedback transformer 29, a PNP transistor 31, germanium rectifier 32, and the necessary resistors and filter elements required in a circuit of this type. Rheostat 30 provides a sensitivity adjustment at contacts 13 and 14.

The detector 26 receives an A.C. signal from oscillator 23 at the time contact is made between members 13 and 14, wherein the signal is amplified by transistor 38, rectified by a germanium rectifier 39 and then again amplified in its D.C. form by transistor 38. It is this amplified D.C. signal which operates relay 42 and controls relay 43. Detector 26 is powered by battery 40 and in addition has a thermistor 41 in the circuit, which compensates for transistor and circuit temperatures which could adversely affect the operation of the detector.

Relays 42 and 43 which are operated by detector 26, are of the conventional D.C. type with relay 42 being a single pole single throw sensitive type and relay 43 being of the double pole double throw power type. The amplified D.C. current from detector 26 energizes sensitive relay 42, and controls power relay 43 which in turn controls the current from battery 45 to the motor 21 at 47, causing motor 21 to operate contact screw 14 in the direction shown by the arrow at A. This reversal of the motor causes the contacts between 13 and 14 to be broken, thereby causing the signal to the detector to be lost, de-energizing relays 42 and 43.

The current through point 48 on motor 21 charges capacitor 49 since the current is blocked by silicon diode 51, then it passed through current limiting resistor 52, conducting transistor 53, thereby operating contact screw 14 in the direction shown by the arrow at B.

In FIG. 2, the resistive output value of pressure supplied by the potentiometer 19 is connected to conventional radiosonde telemetering equipment 61, comprising a modulator 62 and transmitter 63 which conveys a signal to ground receiving station 66, comprising a receiver 77, demodulator 78, and recorder 79, where the received signal is demodulated and recorded as a resistive value of pressure. This value is converted to pressure in millibars.

To more fully explain the operation, one complete cycle is described, but it is understood that the device will continue and cycle as long as battery current is supplied. Initially a current is supplied by battery 45 through contacts 68 on the double pole relay 43 to point 47 on the motor 21 after being passed through transistor 53, whereby motor 21 is driven in one direction, which changes the resistive value of the potentiometer 19 and drives contact screw 14 in the direction shown by arrow B into contact with contact 13 on the aneroid cells 9. Upon members 13 and 14 making contact, a signal is supplied to oscillator 23 wherein the signal is conveyed as an A.C. signal to a detector 26 by means of an impedance matching transformer 27. The A.C. signal input to the detector 26 is converted to a D.C. current which operates relay 42, driving the contact from the open position at 64 to the closed position at 65 wherein relay 43 is energized, moving the contacts from the position at 68 to the position at 69, causing motor 21 to operate contact screw 14 in the opposite direction (indicated by arrow A) breaking the contacts 13 and 14, thereby cutting off the signal to oscillator 23 and detector 26, and deenergizing relays 42 and 43. A time delay is provided by delay circuit 44 including diode 51, capacitor 49, and transistor 53, so that motor 21 will remain at rest for a short period of time before moving in the direction shown by arrow B to start the cycle all over. The time delay provision was necessary to show a clear indication of the resistive value of pressure on the recording device 69.

In summary, a pressure measuring device as described can be constructed from primarily well known component parts, and will provide a resistive value of pressure having a sensitivity of 0.02 millibar at the 5 millibar level, or an accuracy of one hundred feet at the one hundred seventeen thousand foot level.

Actual circuit values used in a representative embodiment of this invention are shown in FIG. 1 of the drawings.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A device for automatically and continuously producing a signal proportional to pressure comprising:
   (a) an arm member,
   (b) a first electrical element mounted on one end of said arm member,
   (c) pressure sensing means mounted on the other end of said arm member,
   (d) a second electrical element connected to said pressure sensing means,
   (e) resistive output means coupled to said first electrical element for providing an electrical output signal proportional to the pressure sensed by said pressure sensing means,
   (f) drive means for driving said resistive output means and said first electrical element, said first electrical element being driven into electrical contact with said second electrical element,
   (g) means connected to said second electrical element responsive to said electrical contact between said first and second electrical elements for producing an electrical signal when contact occurs,
   (h) relay means operatively coupled between said means responsive to said electrical contact and said drive means and for causing said drive means to move said first electrical element away from said second electrical element after contact, and
   (i) delay circuit means coupled between said relay means and said drive means for delaying said drive means when said relay means is deenergized before said drive means drives said first electrical element toward said second contact means.

2. An automatic pressure measuring device as set forth in claim 1 further including means for indicating the value of pressure.

3. An automatic pressure measuring device as set forth in claim 2 wherein said arm member is U-shaped.

4. An automatic pressure measuring device as set forth in claim 3 wherein said means responsive to electrical contact is a blocking oscillator.

5. An automatic pressure measuring device as set forth in claim 4 further including a sensitivity adjustment means operatively coupled across said first and second elements.

6. An automatic pressure measuring device of claim 5 further including temperature sensitive means connected between said first electrical contact and said resistive output means.

7. An automatic pressure measuring device as set forth in claim 6 further including temperature compensating means in said means responsive to electrical contact.

References Cited by the Examiner

UNITED STATES PATENTS

| | | | |
|---|---|---|---|
| 1,781,880 | 11/1930 | O'Hagan | 318—283 X |
| 2,287,786 | 6/1942 | Diamond et al. | 73—170 X |
| 2,323,311 | 7/1943 | Crane et al. | 318—283 X |
| 2,358,803 | 9/1944 | Hanson et al. | 318—31 X |
| 2,437,064 | 4/1948 | Anderson, Jr. | 73—386 X |
| 2,441,585 | 5/1948 | Moorman et al. | 318—31 |
| 2,709,233 | 5/1955 | Hage | 318—31 |
| 2,923,153 | 2/1960 | Westman | 73—407 |
| 3,112,649 | 12/1963 | Pike et al. | 73—386 |

RICHARD C. QUEISSER, *Primary Examiner.*

J. J. SMITH, E. F. KARLSEN, *Examiners.*